Figure 1:
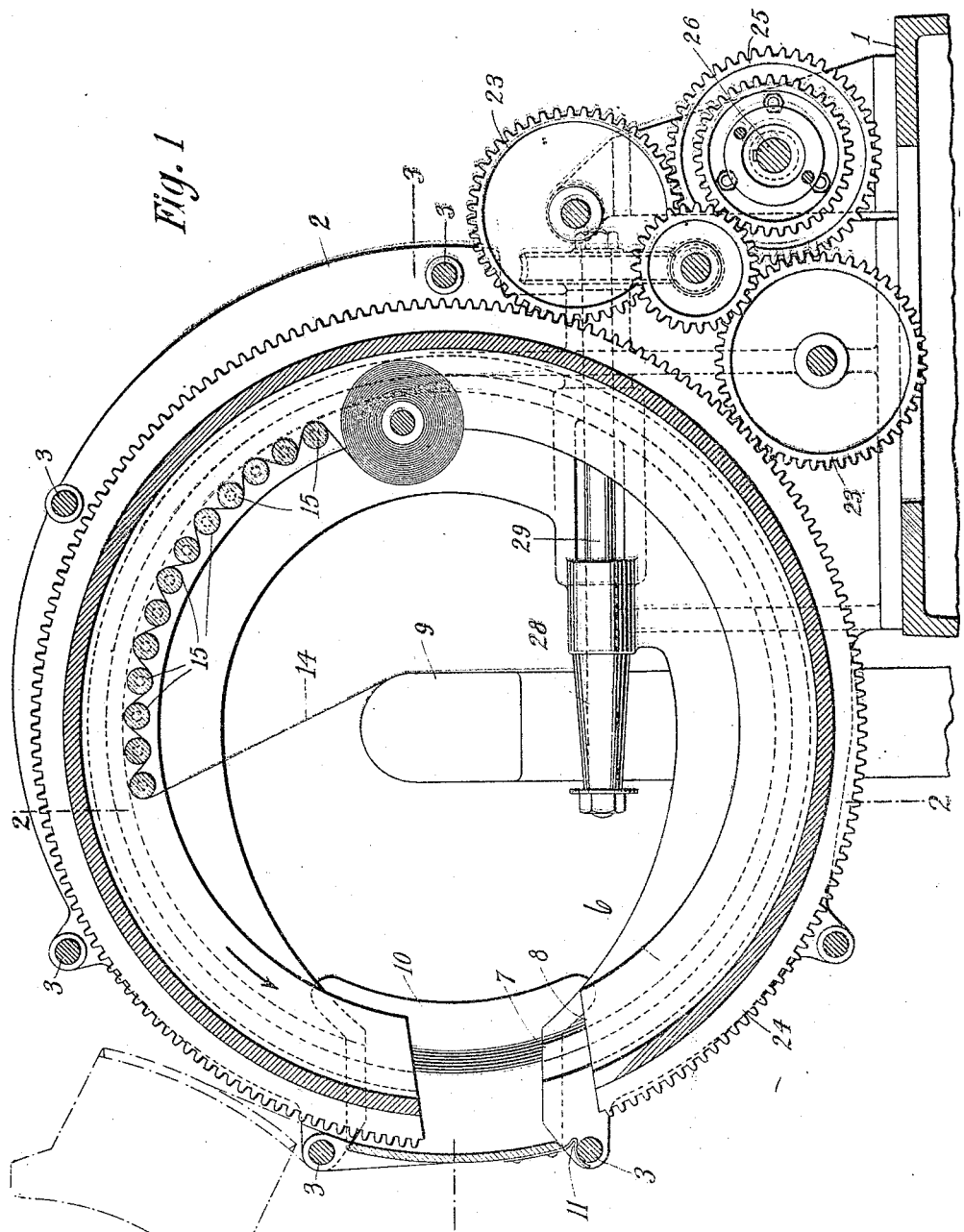

T. MIDGLEY.
APPARATUS FOR WRAPPING PNEUMATIC TIRE CASINGS.
APPLICATION FILED NOV. 17, 1906.

1,161,946.

Patented Nov. 30, 1915.
4 SHEETS—SHEET 1.

T. MIDGLEY.
APPARATUS FOR WRAPPING PNEUMATIC TIRE CASINGS.
APPLICATION FILED NOV. 17, 1906.

1,161,946.

Patented Nov. 30, 1915.
4 SHEETS—SHEET 4.

UNITED STATES PATENT OFFICE.

THOMAS MIDGLEY, OF HARTFORD, CONNECTICUT, ASSIGNOR TO THE HARTFORD RUBBER WORKS COMPANY, A CORPORATION OF CONNECTICUT.

APPARATUS FOR WRAPPING PNEUMATIC-TIRE CASINGS.

1,161,946.   Specification of Letters Patent.   Patented Nov. 30, 1915.

Application filed November 17, 1906. Serial No. 343,813.

*To all whom it may concern:*

Be it known that I, THOMAS MIDGLEY, a citizen of the United States, residing in Hartford, county of Hartford, and State of Connecticut, have invented a new and useful Improvement in Apparatus for Wrapping Pneumatic-Tire Casings, of which the following is a specification.

This invention relates to apparatus for applying a wrapping of textile fabric or the like to shoes or casings of pneumatic tires preparatory to vulcanization.

When the shoes or casings for pneumatic tires are vulcanized or cured by what is commonly known as an "open heat," it is customary to support the shoes or casings upon a suitable support, preferably an annular core or form, and to apply to the outer surface of a shoe or casing so supported a wrapping of porous material through which the heated gas or vapor of the vulcanizing chamber can penetrate to the unvulcanized rubber stock entering into the structure of the tire. Ordinarily, this wrapping of porous material is applied by hand and the successive turns of the wrapping are wound transversely around the tire shoe or casing and the supporting devices therefor. When the wrapping is applied in this way it is a matter of considerable difficulty to apply it with uniform tension and with the successive turns overlapped to precisely the extent desired to hold the unvulcanized rubber stock in proper form so that it will not flow when softened by vulcanizing heat and so that it will be subjected to the desired degree of pressure throughout. Moreover, the application of the wrapping by hand requires considerable time and must be done by a skilled operative to insure proper application.

The present invention has for its object the provision of a machine by which a wrapping of suitable porous material, such as a strip of muslin cut bias, may be applied over the pneumatic tire shoe or casing when supported upon a suitable core or form, and the invention also contemplates the provision of a machine by which the wrapping of pneumatic tire shoes or casings may be carried on more expeditiously than it can be done by hand and with perfect uniformity of tension throughout the entire wrapping.

Other objects of the invention will appear in the course of the following description, in which reference is had to the accompanying drawings illustrative of the invention, in which corresponding parts are designated by similar characters of reference throughout the several views.

Figure 2:
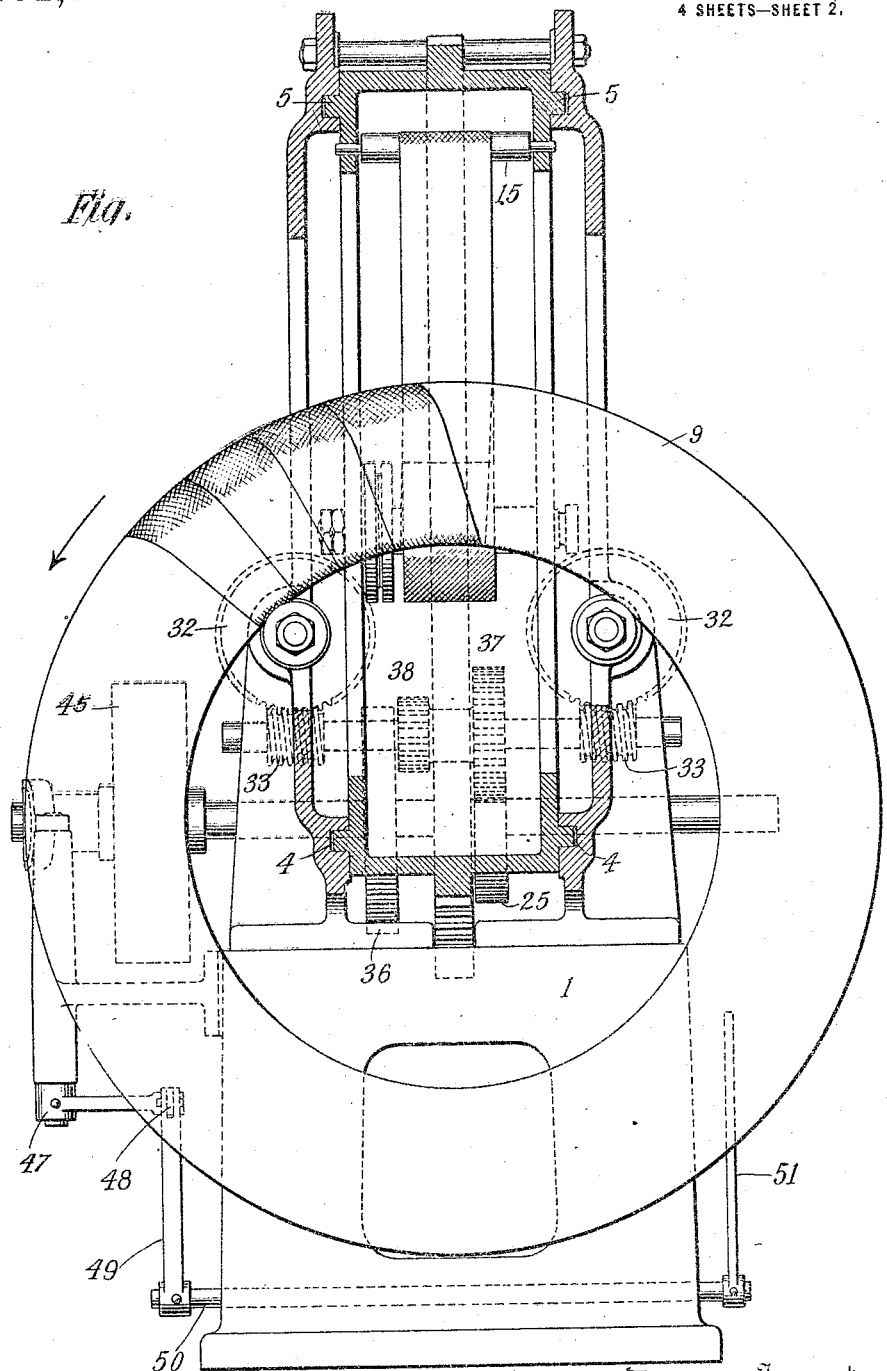
Figure 3:
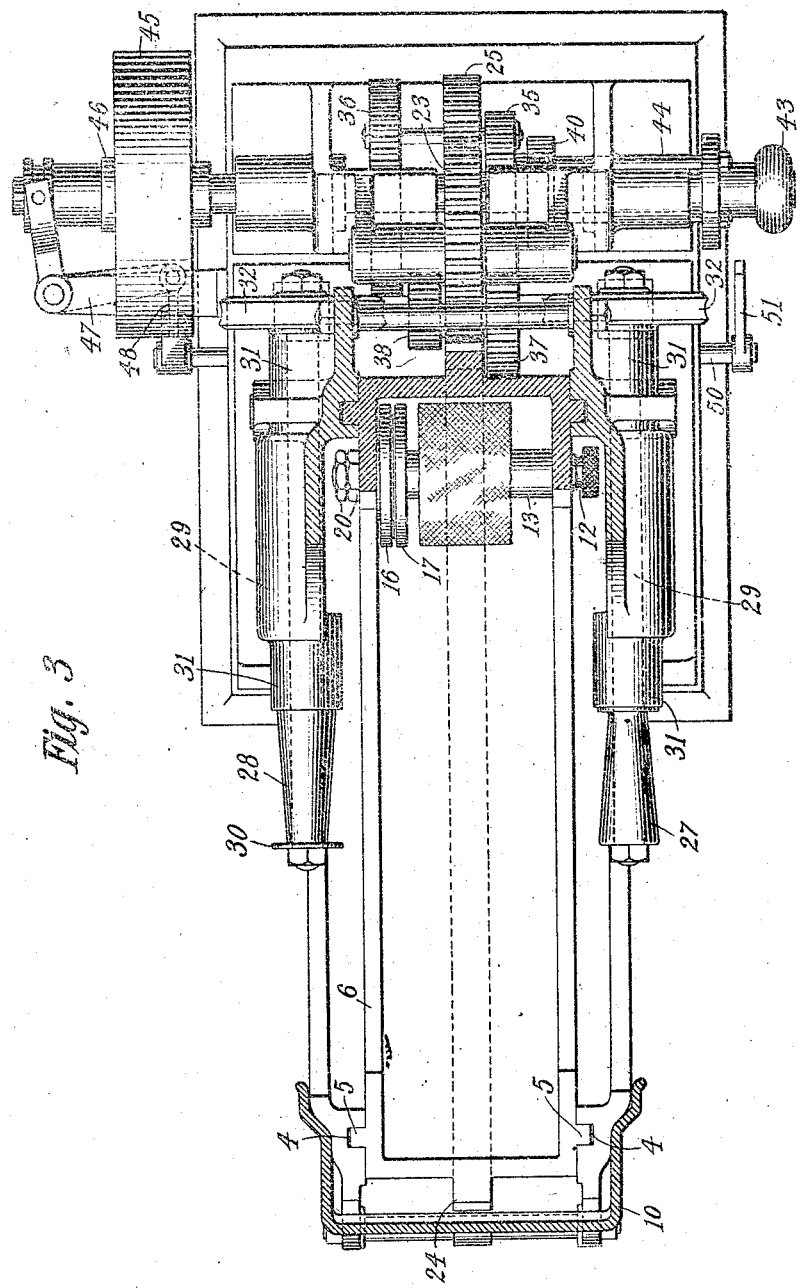
Figure 4:
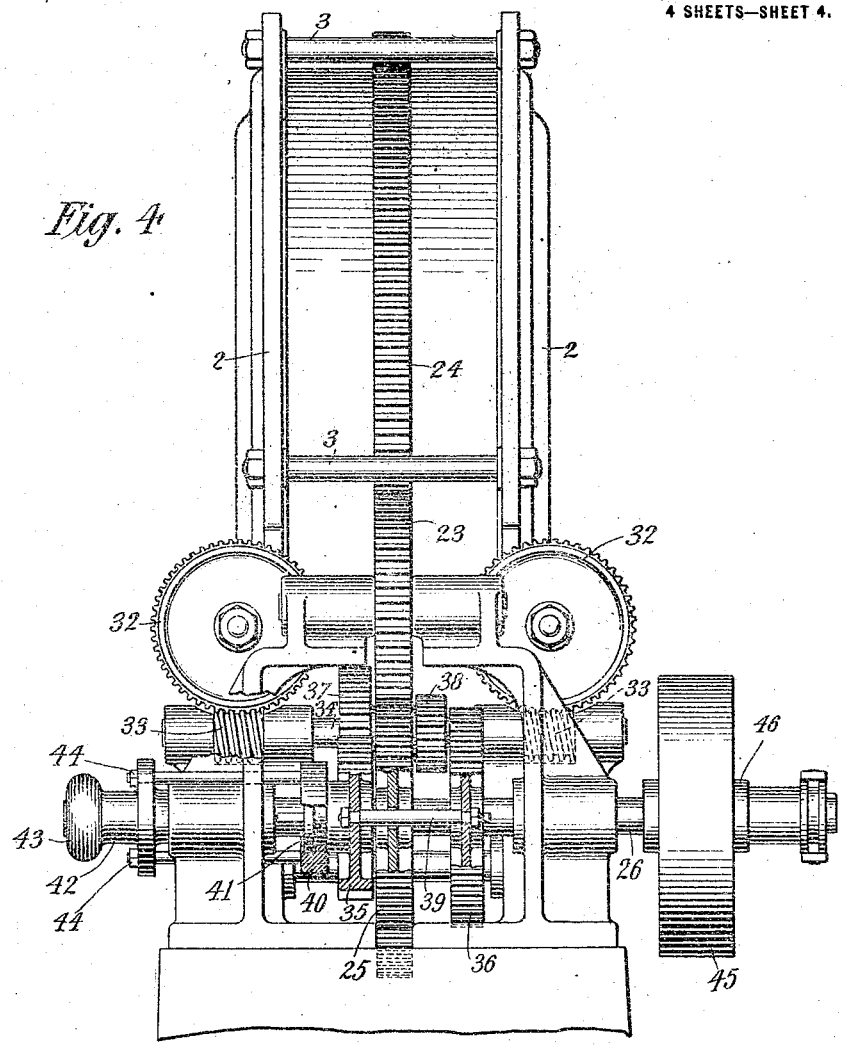
Figure 5:
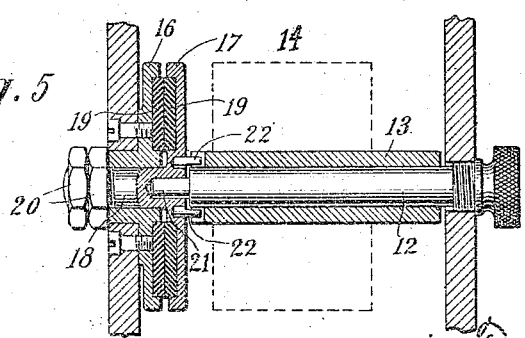

In the drawings: Figure 1 is a view partly in side elevation but principally in vertical longitudinal section of the upper portion of the tire-wrapping machine, the tire shoe and supporting devices being indicated diagrammatically only. Fig. 2 is a transverse sectional view of the entire machine taken on the line 2—2 of Fig. 1 and showing a portion of the wrapping applied to the tire shoe and supporting devices, which are diagrammatically indicated. Fig. 3 is a horizontal sectional view on the line 3—3 of Fig. 1. Fig. 4 is a view in rear elevation of the upper portion of the machine shown in Fig. 1, parts being broken away to show details of internal construction. Fig. 5 is a sectional detail view showing the mounting of the spool or sleeve carrying the supply of wrapping material.

Described in general terms, the machine comprising the present invention comprises a suitable supporting frame-work, formed preferably of heavy castings, by which the working parts of the machine are carried, devices for supporting and slowly turning in their own plane the tire shoe and the supporting devices therefor, a rotary shuttle carrying a spool of wrapping material, and means for rotating the shuttle so as to carry the spool around the tire and supporting devices in successive turns so disposed in relation to the tire and each other as to form a complete wrapping for such portions of the tire as may not be covered by the tire-supporting devices. The machine comprises also, of course, gearing adapted to impart movement to the various parts at suitable speeds and tension devices by means of which the tension upon the wrapping material may be kept uniform during the process of wrapping the tire shoe.

Referring now to the drawings by the reference characters marked thereon, 1 designates the main frame of the machine, on the top of which is mounted a shuttle guide consisting of a pair of castings 2 arranged in parallel planes and secured by transverse bolts 3 placed at suitable intervals. The castings 2 are provided on their inner faces with curved channels 4 to receive corresponding ribs 5 formed on the outer lateral faces of the shuttle 6. The grooves 4 and the ribs 5 are formed on circular curves of equal radii; but both the castings 2 forming the shuttle guide and the shuttle itself are interrupted as shown at 7 and 8 to form gaps which may be brought into coincidence so that the tire shoe or casing with its support, diagrammatically indicated at 9, may be introduced within both the shuttle and the shuttle guide, as shown in Figs. 1 and 2. The gap formed in the shuttle guide can be closed by means of a door or closure 10 pivotally mounted on one of the bolts 3 and preferably provided with a spring latch 11 which engages with another one of the bolts 3 to secure the door or closure when in position to cover the gap. The shuttle 6 is provided with a removable pin 12 which is threaded in one side wall of the shuttle, as best shown in Fig. 5, which affords support for a spool or sleeve 13 on which is wound the strip 14 of wrapping material, and a series of tension rollers 15 is also mounted within the shuttle adjacent to the pin 12 between which the strip of wrapping material is carried in a sinuous path before being applied to the tire shoe. The proper tension on the wrapping strip is not maintained, however, by means of the tension rollers alone, but additional tension devices are provided. These tension devices, which are illustrated in Fig. 5, comprise a fixed disk 16 secured to one of the side walls of the shuttle adjacent to the pin 12 and a rotatable disk 17 having a supporting pin 18 at its center which extends through an opening provided at the center of the disk 16. Both the disks 16 and 17 are faced with annular pieces 19 of leather or other suitable friction-producing material, and adjusting nuts 20 are provided on the threaded pin 18 to regulate the friction produced between the two pieces 19 of friction-producing material. In the center of the disk 17 and extending into the pin 18 is a socket which receives a reduced extension 21 at the end of the pin 12 on which the spool 13 is rotatably mounted and a pair of pins 22 eccentrically mounted on the disk 17 engage notches formed in the end of the spool 13, thereby locking the spool to the disk 17 so that the two structures must rotate together.

Rotation is imparted to the shuttle 6 by a pair of gears 23 which engage a curved rack 24 formed on the external curved surface of the shuttle. These gears 23 engage the rack at points sufficiently far apart to insure the engagement of one of the gears with the rack when the gap 8 in the shuttle is passing the other gear, and both the gears 23 are driven from a gear 25 which is keyed to the main driving shaft 26 of the machine.

To hold the tire and its supporting devices in proper position relative to the shuttle, two oppositely tapered conical supports 27 and 28 are provided at opposite sides of the shuttle guide on a pair of shafts 29 and the conical support 28 is provided at its smaller extremity with a flange or washer 30 to prevent the tire and its support from sliding off. The shafts 29, to which the conical supporting members 27 and 28 are secured, are mounted in bearings 31 and suitable devices are employed for imparting a slow rotation to the shafts in order to advance the tire and its support continuously during the wrapping operation so that successive turns of the wrapping material may be overlapped to the required extent. The rate of rotation of the shafts 29 must be slow, as the tire and its support are required to advance only a few inches at each complete turn of the shuttle with the spool of wrapping material. Accordingly, worm gears 32 are provided on the shafts 29 and worms 33 on a shaft 34 mesh therewith. The shaft 34 is parallel to the main driving shaft 26 and is driven therefrom by gears which are preferably so arranged that the shaft 34 may be rotated at two different speeds. These gears comprise a gear 35 and a gear 36 mounted on the main driving shaft and gears 37 and 38 mounted on the shaft 34. The gears 35 and 36 are connected by bolts 39 extending through apertures in the gear 25 and are spaced apart at such a distance that when the gear 35 is in mesh with the gear 37 the gear 36 is not in mesh with the gear 38, and vice versa.

To shift gears to change the speed of the shaft 34 a collar 40 is provided on the hub of the gear 35 with an internal rib engaging a circumferential groove 41 in the hub and a sliding sleeve 42 with a knob 43 is mounted on the main driving shaft 26 external to the main frame of the machine and connected by bolts 44 with the collar 40. When the knob 43 is grasped and drawn to the left from the position shown in Fig. 4, the gear 35 passes out of engagement with the gear 37 and the gear 36 is brought into engagement with the gear 38, thus increasing the speed of the shaft 34 and increasing the width of the exposed portion of each successive turn of the wrapping material.

To provide for the transmission of power to the main driving shaft, a pulley 45 is mounted on the main driving shaft and a clutch 46 is provided to lock the pulley to the shaft or allow it to run loose thereon, as desired. The clutch 46 is operated through the bell crank 47, the link 48 and an arm 49 mounted on a rock shaft 50 to which is attached the operating lever 51.

In the operation of the machine the spool of wrapping material is first introduced and secured on the pin 12, then the strip of wrapping material is passed between the tension rollers 15 as shown in Fig. 1. The end of the strip of wrapping material is next applied to the tire, which is mounted with its supporting core upon the conical supporting members 27 and 28. The machine is then set in operation and the tire and supporting core are slowly rotated in their own plane, as indicated in Fig. 2, while the shuttle with the spool of wrapping material carried thereby is turned in the direction indicated in Fig. 1 at a rate such as to apply the strip of wrapping material in a series of overlapping turns or whirls. After a complete rotation of the tire and supporting devices has been made, the tire will be completely covered with a wrapping consisting of at least one thickness of wrapping material throughout. If desired, and this is the practice ordinarily followed, the speed of rotation of the shafts 29 may then be changed and a second wrapping applied in which the width of the exposed portion of each turn of the wrapping material is less than in the first wrapping.

While two wrappings of the tire preparatory to vulcanization are ordinarily applied and this has been found to be good practice, it is obvious that a single wrapping may suffice or that more than two wrappings may be applied if desired.

When the desired number of wrappings have been applied to the tire, the door 10 will be opened and the wrapped tire and supporting devices will be removed and another tire clamped upon its core and ready for wrapping will be introduced within the shuttle and mounted on the conical supporting members 27 and 28.

While I have described and illustrated a single embodiment only of my invention, it will be obvious that the details of construction may be varied very considerable without substantially altering the mode of operation of the machine.

Having thus described my invention, what I claim as new and desire to secure by Letters Patent is:

1. In an apparatus for wrapping circular bodies, a fixed annular shuttle guide comprising two separated laterally disposed guiding portions, an annular shuttle rotatably mounted in said shuttle guide between said guiding portions and having an internal annular recess, devices mounted in said recess for holding a supply of wrapping material, means for supporting and rotating a tire shoe in a plane intersecting the plane of said shuttle, and means engaging said shuttle exteriorly and between said guiding portions for rotating the same to supply said wrapping material.

2. A machine of the type set forth, comprising a supporting annulus, an annulus rotatably mounted therein, means carried by said supporting annulus for suspending a tire, means carried by said rotatable annulus for wrapping a tire, and means carried by said supporting annulus for rotating said rotatable annulus.

3. A machine of the type set forth comprising a supporting annulus, an annulus rotatably mounted therein, means carried by said supporting annulus for suspending a tire, means carried by said last named annulus for wrapping a tire, and means on said supporting annulus for rotating said last named annulus.

4. In apparatus of the character specified, a fixed shuttle guide, an annular shuttle mounted in said guide and adapted to rotate in a vertical plane, a pair of supporting spindles located close together so as to pass within a tire shoe and turning about fixed horizontal axes on opposite sides of the plane of rotation of the shuttle and adapted to rotate a tire shoe when suspended from its inner side upon said spindles, and devices carried by said shuttle for applying a wrapping to said tire shoe.

5. In apparatus of the character specified, a fixed shuttle guide, an annular shuttle mounted in said guide and adapted to rotate in a vertical plane, a pair of reversibly tapered supporting spindles turning about fixed horizontal axes on opposite sides of the plane of rotation of the shuttle and adapted to rotate a tire shoe when suspended upon said spindles, and devices carried by said shuttle for applying a wrapping to said tire shoe.

6. In an apparatus for wrapping circular bodies, a fixed annular shuttle guide comprising two separated laterally disposed guiding portions, an annular shuttle having a gap to permit the passage therethrough of a tire and rotatably mounted between said shuttle guides and having an internal annular recess and external gear teeth, devices mounted in said recess for holding a supply of wrapping material, means for supporting and rotating a tire shoe in the plane intersecting the plane of said shuttle, a plurality of driving wheels, each adapted to operatively engage said external gear on said shuttle at points separated a distance greater than the length of said gap, to maintain constant a driving engagement between said shuttle and one of said wheels, and means for driving said wheels.

7. In apparatus of the character specified, tire wrapping devices adapted to rotate in one plane, tire rotating devices adapted to rotate a tire in a plane intersecting the plane of rotation of the wrapping devices, a main driving shaft, gearing intermediate said shaft and each of said rotating devices, the intermediate gearing for one of said devices embodying two trains of gears of different speed ratios and means to render either of said trains of gears operative whereby the wrapping material may be laid in laps of varying widths.

8. In a tire wrapping machine, an annular supporting frame, an annular shuttle rotatably mounted within said frame and having an internal recess therein, a spool having a laterally movable flange mounted in said recess, a circular brake disk carried on the wall of said shuttle and engaging said movable flange, and means for drawing said flange toward said disk.

9. In a tire wrapping machine, an annular supporting frame, a shuttle rotatably mounted in said frame and having an internal recess therein, a spool having a movable flange mounted in said recess, a circular brake disk carried on the wall of said shuttle and means extending through said wall and through said disk for adjustably drawing said flange toward said disk.

10. In a tire wrapping machine, in combination with means for wrapping fabric about a tire, tire supporting means comprising a stationary support, parallel shafts carried thereby and situated close together and at each side of the plane of movement of the wrapping means, pulleys on said shafts and on which the tire hangs, and means for positively rotating one of said shafts.

11. In a tire wrapping machine, in combination with means for wrapping fabric about a tire, tire supporting means comprising a stationary support, parallel shafts carried thereby and situated at each side of the plane of movement of the wrapping means, reversely tapered supporting spindles on said shafts and on which the tire hangs, and means for positively rotating one of said shafts.

12. In a tire wrapping machine, a housing, a ring mounted in said housing and provided with gear teeth, a plurality of gears mounted in said housing and meshing with the teeth on said ring, a shaft passing through said housing and mechanically connected to one of said gears for driving the same, whereby motion is communicated from said shaft to said ring, a reel adapted to be supplied with a suitable strip of flexible material and mounted on said ring, a pair of rollers each mounted on a rotatable shaft, worm wheels on said shafts, worms mechanically connected with said first mentioned shaft and arranged to mesh with said worm wheels, and means to retain said tire in frictional engagement with said rollers, said tire being so placed as to pass through the space inclosed by said ring.

In testimony whereof, I have signed my name in the presence of two witnesses.

THOMAS MIDGLEY.

Witnesses:
 H. RICHARD WOBSE,
 BAXLER MORTON.